Aug. 15, 1933.  W. BAGGE  1,922,344
GAUGING INSTRUMENT FOR VEHICLE WHEELS
Filed Sept. 30, 1929  4 Sheets-Sheet 1
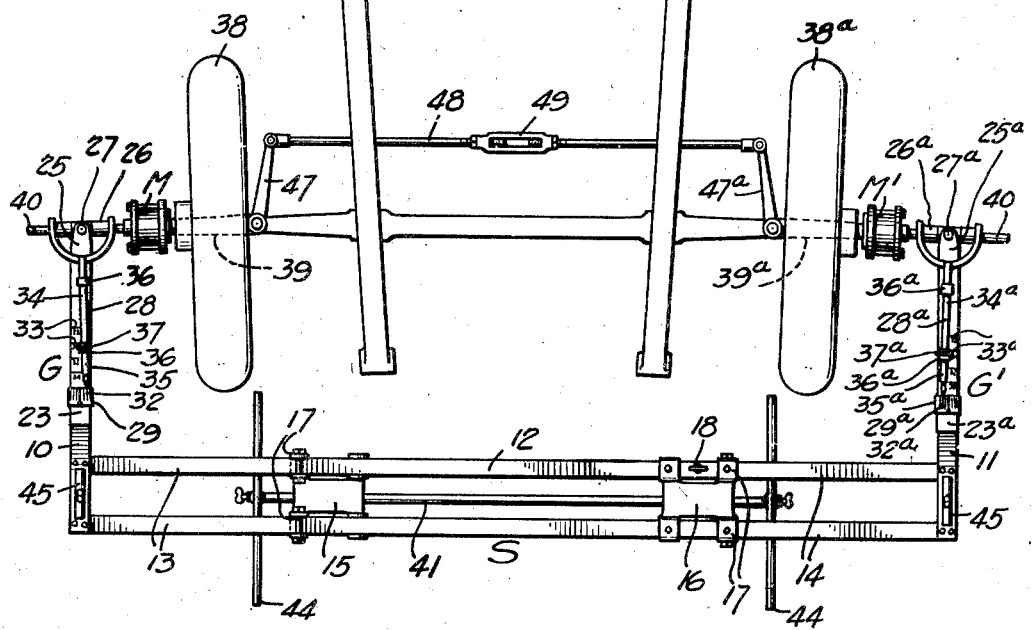
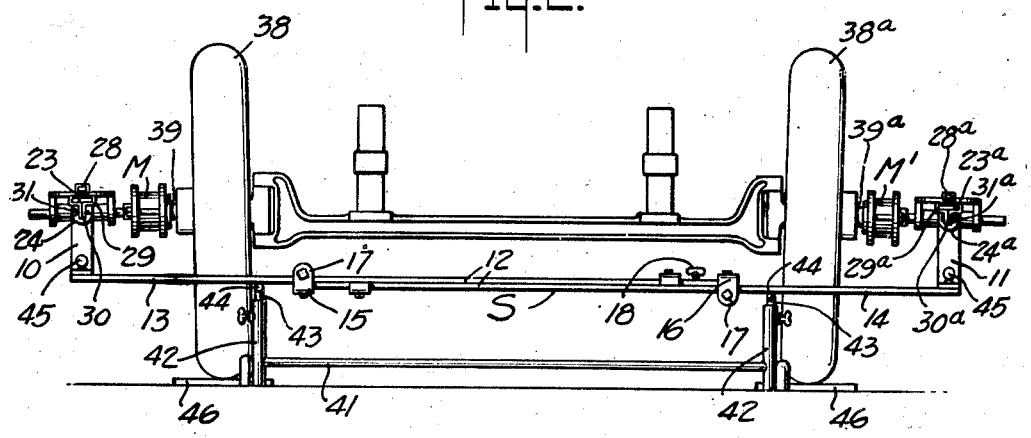
INVENTOR
WALTER BAGGE
BY
ATTORNEYS

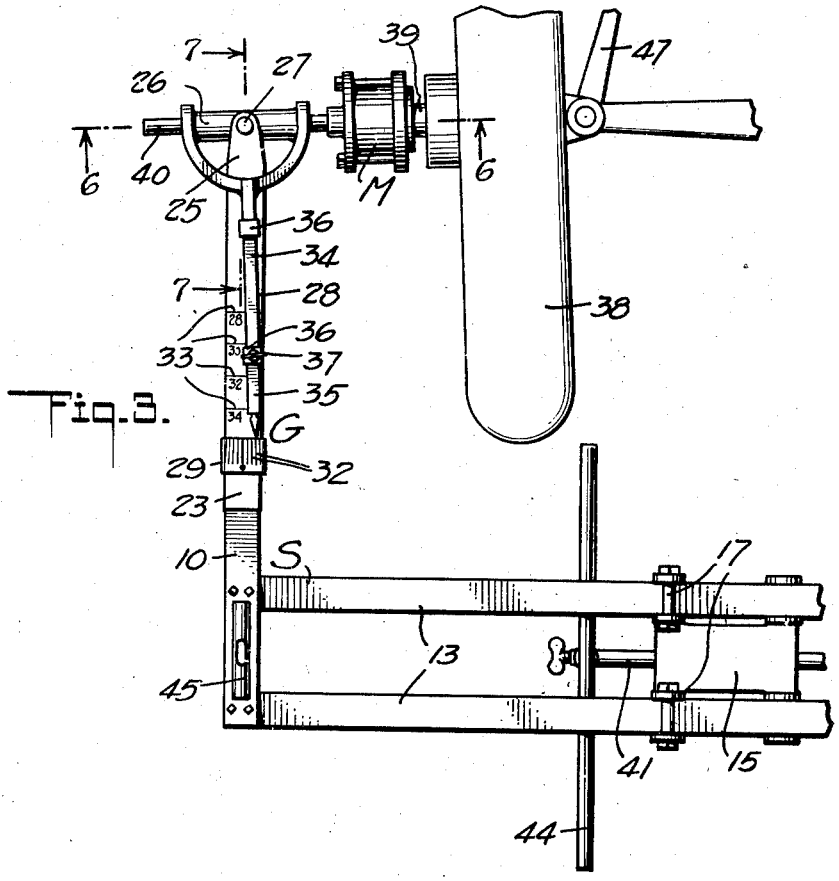
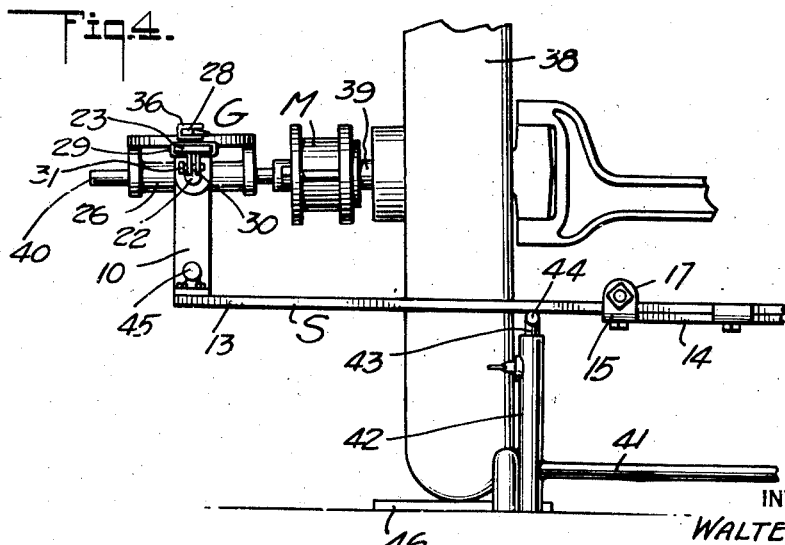

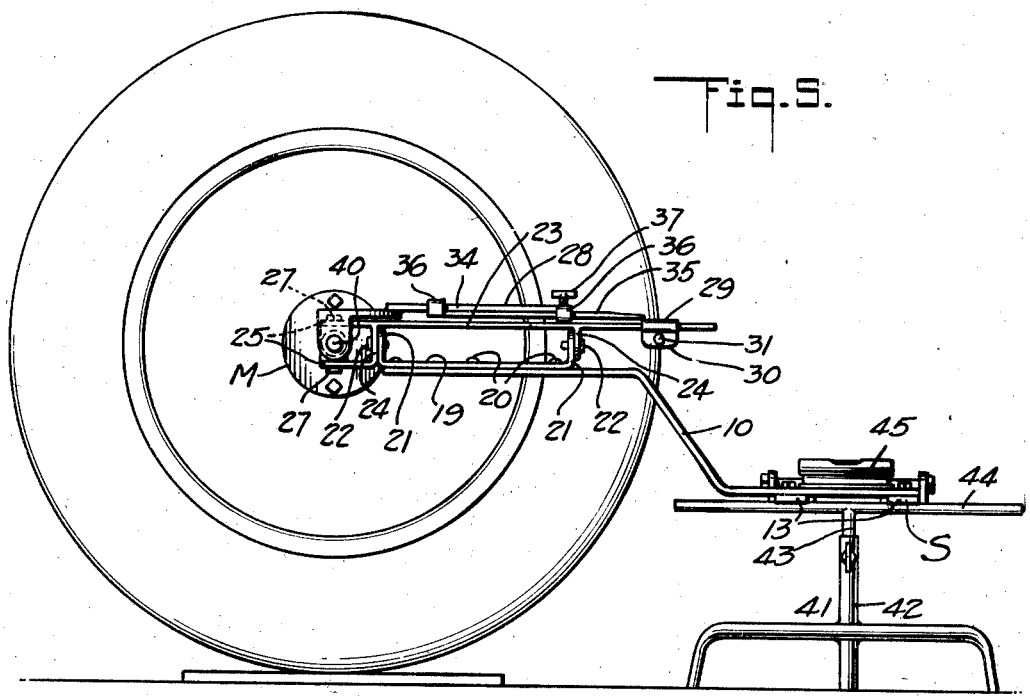
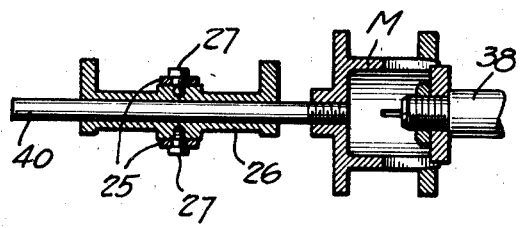
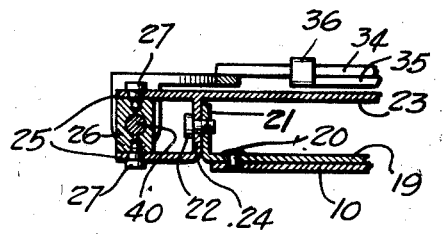
INVENTOR
WALTER BAGGE

Aug. 15, 1933.  W. BAGGE  1,922,344
GAUGING INSTRUMENT FOR VEHICLE WHEELS
Filed Sept. 30, 1929  4 Sheets-Sheet 4
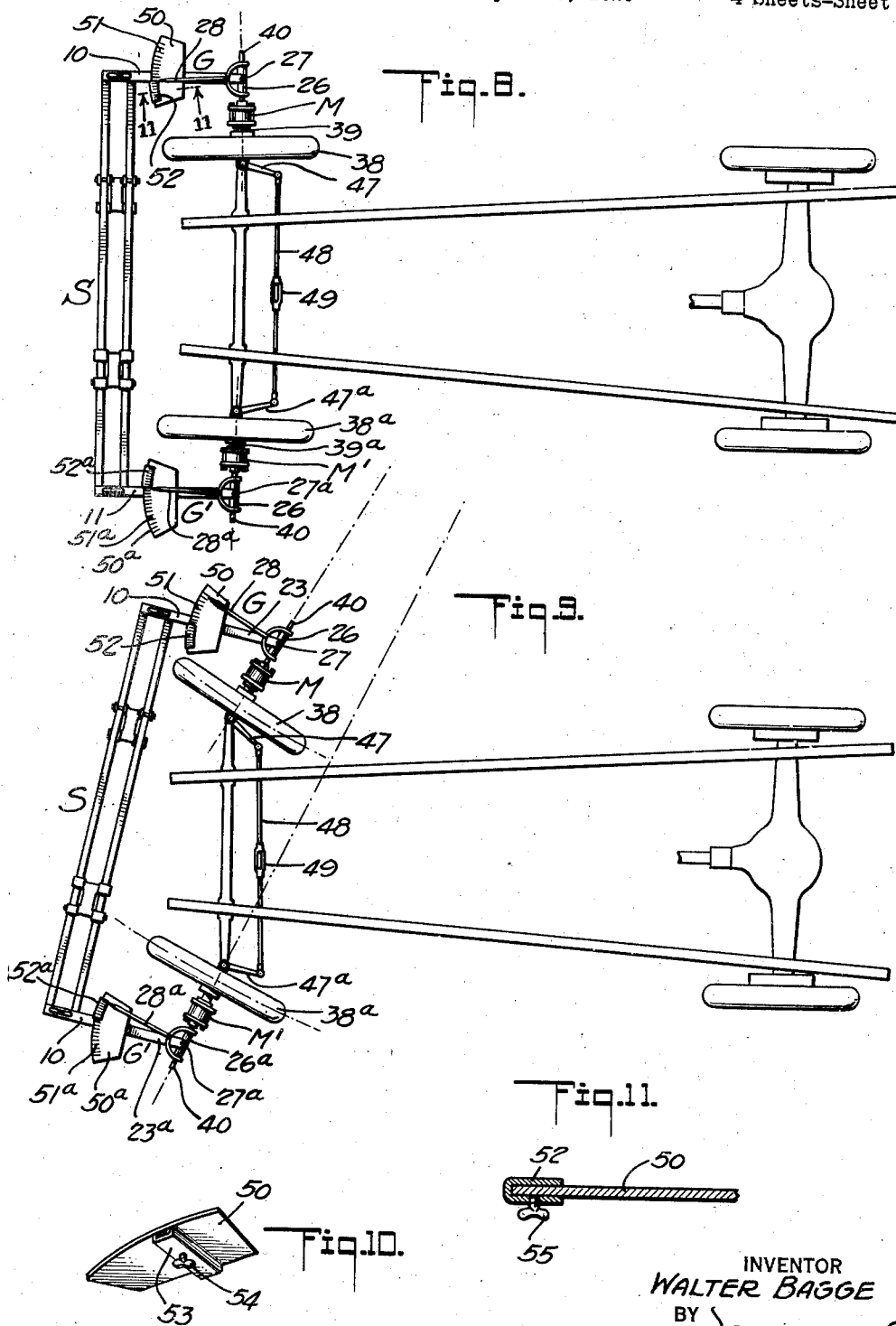
INVENTOR
WALTER BAGGE
BY
ATTORNEYS Patented Aug. 15, 1933

1,922,344

UNITED STATES PATENT OFFICE 1,922,344

GAUGING INSTRUMENT FOR VEHICLE WHEELS

Walter Bagge, Los Angeles, Calif.

Application September 30, 1929
Serial No. 396,255

15 Claims. (Cl. 33—203)

My invention relates to and has for a purpose the provision of a gauging instrument which in its association with the front or steering wheels of automobiles for example, will accurately indicate the toe-in and turning radii of the wheels, all in such manner that should the toeing positions of the wheels and the movements thereof in executing turns, not be in accordance with the precalculated settings required in order to insure easy steering and prevent unnecessary tire wear, the instrument will accurately detect and indicate the incorrectness so that the necessary adjustments to obtain the precalculated settings and turning movements of the wheels can be made.

It is a further purpose of my invention to provide a gauging instrument of the above described character which enables various misalignments of the vehicle's chassis, such as bent axles or axle housings, shifting of the positions of the axles with respect to the frame as well as a deformed condition of the frame, to be readily detected, thus greatly extending the usefulness of the instrument.

I will describe only one form of gauging instrument for vehicle wheels embodying my invention and will then point out the novel features thereof in claims.

In the accompanying drawings,

Figure 1 is a view showing in plan one form of gauging device embodying my invention applied to a vehicle and illustrating the use of the device in determining the toe-in of the steering wheels of the vehicle.

Figure 2 is a view of the gauging device in front elevation.

Figure 3 is an enlarged fragmentary view in plan of a portion of the gauging instrument shown in Figure 1.

Figure 4 is an enlarged fragmentary view in front elevation of the portion of the gauging instrument shown in Figure 3.

Figure 5 is an enlarged view in side elevation, of the gauging instrument.

Figures 6 and 7 are enlarged sectional views taken respectively on the lines 6—6 and 7—7 of Figure 3 and looking in the direction of the respective arrows.

Figures 8 and 9 are plan views of the gauging device and illustrating the use of the latter on a vehicle in determining the turning radius of the steering wheels.

Figure 10 is a perspective view of one of two master dials used when determining the turning radius, and Figure 11 is an enlarged sectional view taken on the line 11—11 of Figure 8 and looking in the direction of the arrows.

Referring specifically to the drawings in which similar reference characters designate similar parts in each of the several views, my invention in its present embodiment comprises a support S in the form of a metallic frame constructed to provide a pair of arms 10 and 11 connected together in spaced apart parallel relation by a connecting member 12 formed in two sections 13 and 14 slidably associated with each other by means of plates 15 and 16, one of which is fixedly secured to one section and the other to the other section and each of which is provided with suitable sleeves 17 slidably receiving the other section. The connecting member is thus rendered extensible and contractible to vary its overall length and hence vary the spacing between the arms 10 and 11; and to secure the sections of the member in any desired adjusted position, a clamp screw 18 is threaded into the section 13, and is adapted to be engageable with the section 14.

The support S broadly provides a means for supporting a pair of gauges G and G' having suitable indicating means and which are supported by the arms 10 and 11. As the gauges are identical in construction, a description of one gauge and the manner in which it is supported by the respective arm, will suffice, and to distinguish like parts of the gauges from each other, the numerals designating the parts of one gauge are provided with exponents.

The gauge G comprises a bracket 19 secured by fastening members 20 to the arm 10 and having a pair of spaced apart upstanding ears 21, on which is pivotally mounted by alined pins 22 passing through the ears for rocking movement laterally of the arms about a horizontal axis, a bar 23 provided with a pair of depending ears 24 through which the pins 22 extend. One of the ears 24 is extended horizontally and co-acts with one end of the bar 23 to form a yoke 25 receiving a sleeve 26 which is mounted in the yoke by trunnions 27 for pivotal movement about a vertical axis intersecting the axis of the sleeve, the vertical axis formed by the trunnions 27 being intersected by the axis formed by the pins 22, which latter axis also intersects the axis of the sleeve, so that in effect a universal connection is provided between the sleeve 26 and the arm 10 for a purpose to be hereinafter described.

Secured to the sleeve 26 and supported thereby above the bar 23 so as to pivot with the sleeve about the axis of the trunnions 27 as a center, is a pointer 28 adapted to traverse a dial 29 in the form of a split sleeve receiving the bar and slidably mounted on the bar for adjustment along the length of the latter. The dial 29 is provided at its split, which is beneath the bar, with a pair of depending ears 30, through which extends a clamping screw 31 for contracting the sleeve at its split and thereby secure the dial in a selected position along the length of the bar.

The upper surface of the dial is provided with graduations 32 representing degrees of wheel toe-in, and the bar is provided with transversely extending graduations 33 numbered to designate various wheel diameters. In the use of the gauge, the dial is adjusted along the bar to the proper wheel diameter; and in order for the pointer to co-act with the graduations of the dial in any selected adjusted position of the latter along the length of the bar, the pointer is constructed in two sections 34 and 35, to each of which is secured a sleeve 36 slidably receiving the other section so as to render the length of the pointer variable in accordance with the adjustment of the dial 29. The sections of the pointer are capable of being secured to each other in a selected position of adjustment by means of a clamp screw 37 threaded into one of the sleeves 36 and engageable with the other section.

It will be clear that the dials and the respective pointers each broadly constitute an indicating means and that in response to relative pivotal movement between the support S and the sleeves 26 and 26ª about the axes of the respective trunnions 27 and 27ª, the pointers will traverse the graduations of the respective dials.

In the use of the gauging instrument in determining the toe-in of the steering wheels 38 and 38ª of a vehicle, the instrument is preferably associated with the spindles 39 and 39ª of the wheels by means of a pair of gauge mountings M and M' of the construction of the mounting set forth in my co-pending application on wheel gauges, Serial No. 214,974, filed August 23, 1927, the gauge mountings being secured to the wheel spindles in the same manner as set forth in the above identified application, and it will suffice for the present application to state that the gauge mountings are secured to the wheel spindles with the gauge supporting portions of the mountings in the form of cylindrical shafts 40, disposed with their longitudinal axes in alinement with the longitudinal axes of the respective spindles.

The shafts 40 are slidably received in the sleeves 26 and 26ª during the use of the gauging instrument so as to mount the instrument on the speed spindles; and a stand 41 is provided for co-action with the gauge mountings in supporting the instrument in an elevated position. In the present instance, the stand 41 includes a pair of tubular standards 42 slidably receiving rods 43, the upper ends of which are provided with horizontal bars 44 on which the connecting member 12 of the support S is adapted to rest and to freely slide. The tubular standards 42 and rods 43 co-act to provide a vertical adjustment of the bars 44 so as to permit leveling of the instrument with respect to the wheel spindles; and in order to facilitate the leveling operation, a pair of conventional spirit levels 45 are employed and are secured to the support S at the ends of its connecting member 12.

The operation of the gauging instrument is as follows:

The vehicle is first rolled onto a suitable floor until its front or steering wheels 38 and 38ª rest upon a pair of metal plates 46 which are placed upon the floor a suitable distance apart to receive the wheels. A quantity of oil is placed upon each of the plates before the wheels are rolled thereon and functions to permit the wheels to assume the natural positions they would occupy under the weight of the vehicle when traveling over a road, as well as steering movement of the wheels as is effected during the use of the instrument in determining turning radius or the relative turning movements of the wheels.

The operation of the instrument in the determining of a toe-in or toe-out condition of the wheels will first be described; and assuming that the gauge mountings M and M' are applied to the wheel spindles 39 and 39ª as shown in Figure 1, the sections 13 and 14 of the connecting member 12 are extended sufficiently to permit the sleeves 26 and 26ª to be slipped onto the shafts 40 of the gauge mountings, after which the stand 41 is placed beneath the support S and the connecting member 12 of the latter rested upon the bars 44 of the stand, all of which is shown in Figures 1 and 2. The bars 44 are now adjusted vertically by vertical adjustment of the rods 43 in the tubular standards 42, until the spirit levels 45 indicate that the instrument is suspended from the gauge mountings and supported by the stand in a position to dispose the axes of the pins 22 and 22ª parallel to a horizontal plane.

The dials 29 and 29ª are now adjusted along the respective bars 23 and 23ª to the particular graduation 33 or 33ª designating the diameter of the wheels 38 and 38ª, and the lengths of the pointers 28 and 28ª are suitably varied so that they will properly co-act with the graduations 32 and 32ª of the respective dials. Should the wheels 38 and 38ª have no toe-in or toe-out, the pointers will point to the zero or central graduation on the dials 29 and 29ª when the wheels are moved to a straight ahead position. It will be clear that due to the pivotal connection between the support S and the sleeves 26 and 26ª, provided by the trunnions 27 and 27ª respectively, that the wheels are rendered free for their steering movements as the spindles 39 and 39ª will be free to occupy their relative positions as determined by the conventional steering arms 47 and 47ª secured to the spindles and connected together by the usual tie rod 48.

However, should a toe-in or toe-out condition of the wheels exist, this will be indicated by moving the wheels to a position wherein either the pointer 28 or 28ª is pointing to the zero graduation on the respective dial 29 or 29ª, thus causing the other pointer through the medium of the support to indicate on the other dial, the number of degrees of toe-in or toe-out. The tie rod 48, which is usually provided with a suitable means such as a turnbuckle 49 to render its length variable, is now adjusted until one of the pointers indicates the desired amount of toe-in when the other pointer coincides with the zero graduation on its respective dial. It will be clear that by virtue of the rigid support S having the dials 29 and 29ª thereon, and the manner in which the wheel spindles are free to move with the pointers 28 and 28ª relatively to the support about the axes of the trunnions 27 and 27ª, that the positions of the pointers with respect to the dials will be positively determined by the actual relationships of the longitudinal axes of the wheel spindles to each other so that an absolutely accurate indication of the existing toe-in condition will be rendered by the gauges. It will thus be clear that each pointer coacts with the respective dial to indicate the position that the respective spindle occupies in its path of steering movement.

Furthermore, with the toe-in of the wheels equalized between the wheels by moving the latter until the pointers 28 and 28ª both give the same indication on the respective dial, so that a squared condition of the axle with the spindles is effected by the instrument, the latter renders it possible to detect various forms of misalignment of the vehicle's chassis. For example, and with the toe-in of the wheels indicated by the instrument as being equalized between the wheels, measurements with a suitable measuring tape between corresponding points on the front and rear wheels on both sides of the vehicle will be equal, providing the front and rear axles and the frame of the vehicle are in proper alinement, whereas such measurements will be different should the front or rear axle be further back on one side of the frame than on the other, or the axles or a horn of the frame be bent. Furthermore, should the frame be out of square and the front and rear axles be in proper alinement and thus be parallel so that such measurements on both sides of the vehicle will be equal, this condition of the frame can be detected by sighting along the front and rear wheels on one side of the vehicle and making a comparison with a corresponding sighting along the front and rear wheels on the other side of the vehcle.

In the use of the gauging instrument for determining turning radius or the relative turning movements of the wheels in executing a right or left turn from a straight ahead position as is controlled by the lengths of, and the angular relationship between the steering arms 47 and 47ª, the dials 29 and 29ª are removed from the respective bars 23 and 23ª and other dials 50 and 50ª are substituted therefor.

These dials 50 and 50ª which I term master dials are in the form of plates having radial graduations 51 and 51ª pre-calculated to co-act with the pointers and with subsidiary dials 52 and 52ª to indicate the proper relative turning movements of the wheels necessary for both wheels to travel without side friction over the ground. It will be appreciated in this connection that in executing a turn, the inside wheel travels on a shorter radius than does the outside wheel and that unless the wheels are caused by the steering arms 47 and 47ª to turn predetermined proportionate amounts, that side friction of the wheels over the ground will result, thus causing unnecessary tire wear as well as rendering the vehicle difficult to control.

The master dials 50 and 50ª are provided with sleeves 53 slidably receiving the bars 23 and 23ª, and are capable of being clamped to the bars by means of clamp screws 54. The subsidiary dials 52 and 52ª are in the form of arcuate strips of U shaped cross section adapted to receive the graduated edge portions of the dials 50 and 50ª and to be clamped in a selected position of adjustment with respect to the graduations of the latter by suitable clamp screws 55. By the provision of the subsidiary dials, it is rendered unnecessary for the toe-in to be removed from the wheels in order that both pointers indicate zero on their respective dials when the wheels occupy a straight ahead position.

To determine the turning radius, and with the master dials 50 and 50ª applied to the bars 23 and 23ª as shown in Figures 4 and 5, the subsidiary dials 52 and 52ª are applied to the inner or confronting sides of the master dials and adjusted along the latter to such positions that with the pointers 28 and 28ª indicating equal amounts on the master dials 50 and 50ª, the pointers will coincide with the inner ends of the subsidiary dials 52 and 52ª as indicated in Figure 8 and will constitute the starting positions of the pointers.

The wheels are now turned to execute a right hand turn for an example, until the pointer 28ª has traversed the subsidiary dial 52ª and coincides with the last graduation thereon, which represents the turning movement of the outside wheel, in this instance the wheel 38ª. Should the relative turning movements of the wheels the correct, the pointer 28 will have concurrently traversed those graduations of the master dial 50 from the outer end of the subsidiary dial 52 thereon to the outermost graduation on the master dial 50, all as shown in Figure 5. However, should this not be the case, and the pointer 28 either fail to travel as far as or to travel beyond the outermost graduation of the master dial 50, it will indicate that the steering arm 47 is accordingly bent either in a direction towards or away from the inner wheel which in this case is the wheel 38. By now reversing the turning movement of the wheels to execute a left hand turn from a straight ahead position, so that the pointer 28 traverses the subsidiary dial 52 and the pointer 28ª, that portion of the master dial 50ª from the subsidiary dial 52ª to the outermost graduation of the master dial 50ª, the position of the pointer 28ª will indicate whether the steering arm 47ª is bent and in which direction.

The universal connection above referred to and provided between the sleeves 26, 26ª and the support S, by the co-action of the trunnions 27, 27ª with the pins 22, 22ª compensates for any camber and/or caster in the wheels which would otherwise cause an inaccurate indication of the toe-in and turning radii of the wheels.

From the foregoing description it will be manifest that I have provided a gaging instrument by which the front or steering wheels of a vehicle can be checked for toe-in and turning radius and an accurate indication rendered of these conditions, all without disturbing the wheels on their spindles and by utilizing the wheel spindles as a basis from which to work.

Although I have herein shown and described only one form of gauging instrument for vehicle wheels embodying my invention, it is to be understood that various changes and modifications may be made therein without departing from the spirit of the invention and the spirit and scope of the appended claims.

I claim:

1. A gauging instrument comprising a support; means for mounting the support on steering spindles of an axle for turning movement relative to the spindles upon steering movement of the latter; a pair of dials on the support; pointers, one for each dial; and means for mounting the pointers for movement in response to steering movement of the spindles so that each pointer will indicate on the respective dial the position that the respective spindle occupies in its path of steering movement.

2. A gauging device of the character described comprising a support, means for connecting the support to the steering spindles of an axle for pivotal movement about axes at a right angle to and intersecting the axes of the respective spindles in response to steering movement of the spindles, and indicating means having co-acting parts relatively movable in response to movement between the support and wheel spindles.

3. A gauging instrument of the character described comprising a support, means for connecting the support to the steering spindles of an axle for pivotal movement relative to the spindles, about axes at right angles to and intersecting the axes of the respective spindles in response to steering movement of the latter, a pair of dials on the support, pointers, one for each of the dials, and means for mounting the pointers for angular movement with the spindles about the aforementioned axes.

4. A gauging instrument of the character described comprising means for connecting together the steering spindles of an axle, and means co-acting with the first means to indicate the relative turning movements of the spindles according as the spindles are moved to execute a right or left turn, the last means including a pair of master dials on the first means, pointers, one for each of the dials and movable with the spindles to traverse the respective dials in response to steering movements of the wheel spindles, and subsidiary dials, one for each of and adjustable on the master dials to compensate for toe-in of the wheel spindles, the subsidiary dials being so positioned on the master dials that according as the wheel spindles are turned in one direction or the other from a central position, one pointer will co-act with the subsidiary dial on one master dial and the other pointer will co-act with the other master dial or vice versa.

5. A gauging instrument comprising a pair of gauges, each having two relatively movable parts; means for connecting one of the two parts of the gauges to the steering spindles of a vehicle for movement therewith; and means operatively connecting the other of the two parts of the gauges to each other for coaction of the parts of the gauges in indicating the relative turning movements of the spindles as moved to execute a right or left turn.

6. A gauging instrument of the character described comprising a pair of gauge mountings, means for securing said mountings to the steering spindles of an axle, a support having a pair of dials thereon, means for mounting the support on the gauge mountings for turning movement relative to said spindles in response to steering movement of the latter, pointers, one for each of the dials, and means for mounting the pointers for movement with said spindles.

7. A gauging instrument of the character described comprising a pair of gauge mountings, having gauge supporting portions, means for securing said mountings to the steering spindles of an axle with said portions disposed in axial alinement with the axes of said spindles, a support having a pair of dials thereon, means for mounting the support on said portions of the gauge mountings for pivotal movement about axes at right angles to and intersecting the axes of the spindles in response to steering movement of the latter, pointers, one for each of the dials, and means for mounting the pointers for movement with said spindles.

8. A gauging instrument of the character described comprising a pair of gauge mountings, each having a gauge supporting shaft, means for securing said mountings to the steering spindles of an axle with said shafts disposed in axial alinement with the axes of the respective spindles, sleeves mounted on said shafts, a support having a pair of dials thereon, means for pivotally connecting the support to the sleeves upon axes at right angles to and intersecting the axes of the respective shafts, and pointers fixed to the sleeves and co-acting with the dials.

9. A gauging instrument of the character described comprising a pair of gauge mountings, each having a gauge supporting shaft, means for securing said mountings to the steering spindles of an axle with said shafts disposed in axial alinement with the axes of the respective spindles, sleeves mounted on said shafts, a support including a pair of arms and a member connecting the arms in spaced relation, dials carried by the arms, means for pivotally connecting the arms to the sleeves upon axes at right angles to and intersecting the axes of the respective shafts, and pointers fixed to the sleeves and co-acting with the dials.

10. A gauging instrument of the character described comprising a support, means for mounting the support on the steering spindles of an axle for movement relative to the spindles in response to steering movement of the latter, and indicating means having co-acting parts, one of which is movable with the support and the other movable with the spindles.

11. A gauging instrument of the character described comprising indicating means having co-acting parts, means for mounting one part of the indicating means on the steering spindles of an axle for movement therewith in response to steering movement of the spindles, and means by which the other part of the indicating means is supported to move relative to said one of the parts when steering movement of the spindles is effected.

12. A gauging instrument of the character described comprising two indicating devices each having two co-acting parts, means for mounting one part of each indicating device on the steering spindles of an axle for movement therewith in response to steering movement of the spindles, and means by which the other part of each device is supported to move relative to said one of the parts of the respective device when steering movement of the spindles is effected.

13. A gauging instrument of the character described comprising two indicating devices each having two co-acting parts, means for mounting one part of each indicating device for movement with the steering spindles of an axle in response to steering movement of the spindles, a support on which the other part of each device is mounted, and means for pivotally mounting the support on the spindles.

14. A gauging instrument comprising a support, means by which the support is adapted to be pivotally connected to the two steering spindles of an axle, and two indicating devices, each having two co-acting parts, one part of each device being secured to the support and the other part to the first means.

15. A gauging instrument comprising a pair of gauges each having two coacting parts; means for rigidly connecting one part of one gauge to one part of the other gauge; means for pivotally mounting said means on the steering spindles of an axle; and means for mounting the other part of the gauges for movement by the respective spindles.

WALTER BAGGE.